United States Patent
Montojo et al.

(10) Patent No.: US 9,247,547 B2
(45) Date of Patent: Jan. 26, 2016

(54) DOWNLINK AND UPLINK RESOURCE ELEMENT MAPPING FOR CARRIER EXTENSION

(75) Inventors: Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1021 days.

(21) Appl. No.: 12/903,995

(22) Filed: Oct. 13, 2010

(65) Prior Publication Data

US 2011/0090854 A1 Apr. 21, 2011

Related U.S. Application Data

(60) Provisional application No. 61/252,115, filed on Oct. 15, 2009.

(51) Int. Cl.
| | |
|---|---|
| *H04W 4/00* | (2009.01) |
| *H04W 72/06* | (2009.01) |
| *H04L 5/00* | (2006.01) |
| *H04W 88/10* | (2009.01) |

(52) U.S. Cl.
CPC .............. *H04W 72/06* (2013.01); *H04L 5/001* (2013.01); *H04L 5/003* (2013.01); *H04L 5/0007* (2013.01); *H04L 5/0023* (2013.01); *H04W 88/10* (2013.01)

(58) Field of Classification Search
CPC ...... H04W 28/04; H04W 72/04; H04W 72/06
USPC ......................................................... 370/329
See application file for complete search history.

(56) References Cited

U.S. PATENT DOCUMENTS

| | | | |
|---|---|---|---|
| 7,136,650 B2 | 11/2006 | Diaz Cervera et al. | |
| 7,173,919 B1 | 2/2007 | Dabak | |

(Continued)

FOREIGN PATENT DOCUMENTS

| | | |
|---|---|---|
| EP | 1622290 A1 | 2/2006 |
| JP | 2008228209 A | 9/2008 |

(Continued)

OTHER PUBLICATIONS

Huawei, "Concept for downlink carrier aggregation in LTE-Advanced", Oct. 3, 2008, 3GPP Draft; 3GPP TSG RAN WG1 Meeting #54bis R1-083703, pp. 1-4.*

(Continued)

*Primary Examiner* — Guang Li
(74) *Attorney, Agent, or Firm* — Steven A. Raney

(57) ABSTRACT

A method, an apparatus, and a computer program product for wireless communication are provided in which resource elements compatible with multiple different communication protocols, which may not be compatible with one another, may be mapped to a radio frame. For example, in an LTE network, equipment configured to be compatible with 3GPP release 8 standards (herein referred to as Rel. 8) may have certain limitations as to what bandwidth is available for use and access, while these limitations may not apply to later releases of LTE standards after Rel. 8 (herein referred to as "New"). Thus, a system bandwidth can be extended to include an extension portion, to which resource elements compatible with the New protocol may be mapped, and a non-extension portion, to which resource elements compatible with either Rel. 8 or the New protocol may be mapped, providing an effective multiplexing of system resources.

22 Claims, 15 Drawing Sheets

(56) References Cited

U.S. PATENT DOCUMENTS

| | | | |
|---|---|---|---|
| 7,688,245 B2 | 3/2010 | Mueck | |
| 7,970,602 B2 | 6/2011 | Toma et al. | |
| 8,064,425 B2* | 11/2011 | Wang et al. | 370/345 |
| 8,194,529 B2* | 6/2012 | Stadelmeier et al. | 370/203 |
| 8,203,929 B2* | 6/2012 | Atungsiri et al. | 370/203 |
| 8,340,124 B2* | 12/2012 | Gerlach et al. | 370/468 |
| 2005/0074034 A1 | 4/2005 | Hwang | |
| 2007/0253466 A1 | 11/2007 | Jones et al. | |
| 2008/0227403 A1* | 9/2008 | Taki | 455/68 |
| 2009/0023808 A1 | 1/2009 | Raman et al. | |
| 2009/0067377 A1* | 3/2009 | Talukdar et al. | 370/329 |
| 2009/0116427 A1* | 5/2009 | Marks et al. | 370/328 |
| 2009/0122884 A1* | 5/2009 | Vook | H04B 7/0689 375/260 |
| 2009/0196217 A1* | 8/2009 | Himmanen et al. | 370/328 |
| 2009/0213723 A1* | 8/2009 | Noh et al. | 370/208 |
| 2009/0262848 A1* | 10/2009 | Choi et al. | 375/260 |
| 2009/0304023 A1* | 12/2009 | Stadelmeier et al. | 370/464 |
| 2009/0323614 A1* | 12/2009 | Wang et al. | 370/329 |
| 2010/0034303 A1 | 2/2010 | Damnjanovic et al. | |
| 2010/0041433 A1* | 2/2010 | Stadelmeier et al. | 455/552.1 |
| 2010/0103885 A1* | 4/2010 | Cordeiro et al. | 370/329 |
| 2010/0157920 A1* | 6/2010 | Choi et al. | 370/329 |
| 2010/0254342 A1 | 10/2010 | Cho et al. | |
| 2010/0316170 A1* | 12/2010 | Gerlach et al. | 375/340 |
| 2011/0002320 A1* | 1/2011 | Yuk et al. | 370/338 |
| 2011/0019622 A1* | 1/2011 | Lee et al. | 370/328 |
| 2011/0096747 A1* | 4/2011 | Seok | 370/329 |
| 2011/0099018 A1* | 4/2011 | Neuendorf et al. | 704/500 |
| 2013/0010619 A1* | 1/2013 | Fong et al. | 370/252 |

FOREIGN PATENT DOCUMENTS

| | | |
|---|---|---|
| JP | 2009077288 A | 4/2009 |
| JP | 2009118016 A | 5/2009 |
| JP | 2009239443 A | 10/2009 |
| JP | 2010200266 A | 9/2010 |
| JP | 2010535001 A | 11/2010 |
| KR | 20120012435 A | 2/2012 |
| TW | 200926708 A | 6/2009 |
| WO | WO2009023808 | 2/2009 |
| WO | 2009061790 A2 | 5/2009 |
| WO | 2009062115 A2 | 5/2009 |
| WO | WO-2009061257 A1 | 5/2009 |
| WO | WO 2009110733 A2 * | 9/2009 |
| WO | WO 2009110744 A2 * | 9/2009 |
| WO | WO-2010049754 A1 | 5/2010 |

OTHER PUBLICATIONS

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.

NTT DOCOMO, Inc.,Update Views on Support of Wider Bandwidth in LTE-Advanced,3GPP TSG RAN WG1 Meeting #54 R1-083015,Aug. 12, 2008,URL,http://www.3gpp.org/ftp/tsg_ran/WG1_RL1/TSGR1_54/Docs/R1-083015.zip.

Taiwan Search Report—TW099135289—TIPO—Jul. 4, 2013.

International Search Report and Written Opinion—PCT/US2010/052967—ISA/EPO—Apr. 20, 2011.

ZTE: "Carrier types for bandwidth extension", 3GPP Draft; R1-093822, 3rd Generation Partnership Project (3GPP), Mobile Competence Centre ; 650, Route Des Lucioles ; F-06921 Sophia-Antipolis Cedex ; France, No. Miyazaki; Oct. 12, 2009, XP050388333, [retrieved on Oct. 5, 2009].

Huawei: "Concept for downlink carrier aggregation in LTE-Advanced" 3GPP Draft; R1-083703, 3rd Generation Partnership Project (3GPP), Mobile Competence Centre ; 650, Route Des Lucioles ; F-06921 Sophia-Antipolis CEDEX ; France, No. Prague, Czech Republic; Sep. 24, 2008, XP050317045 [retrieved on Sep. 24, 2008].

International Search Report and Written Opinion—PCT/US2010/052969—International Search Authority, European Patent Office, Jan. 31, 2011.

Qualcomm Europe: "Carrier Aggregation Operation in LTE-Advanced", 3GPP Draft; R1-083811, 3rd Generation Partnership Project (3GPP), Mobile Competence Centre ; 650, Route Des Lucioles ; F-06921 Sophia-Antipolis CEDEX ; France, No. Prague, Czech Republic; Sep. 24, 2008, XP050317135, [retrieved on Sep. 24, 2008] paragraph [02.2].

Qualcomm Europe,"Notions of segment and backwards/non-backwards compatible carriers",3GPP TSG RAN WG1 #57bis, R1-092704,Jul. 2009,pp. 1-2, URL, http://www.3gpp.org/ftp/tsg_ran/wg_1 rl1/TSGR1_57b/Docs/R1-092704.zip.

Taiwan Search Report—TW099135288—TIPO—Nov. 11, 2013.

European Search Report—EP14167658—Search Authority—Munich—Aug. 7, 2014.

* cited by examiner

Downlink Radio Frame

Uplink Radio Frame

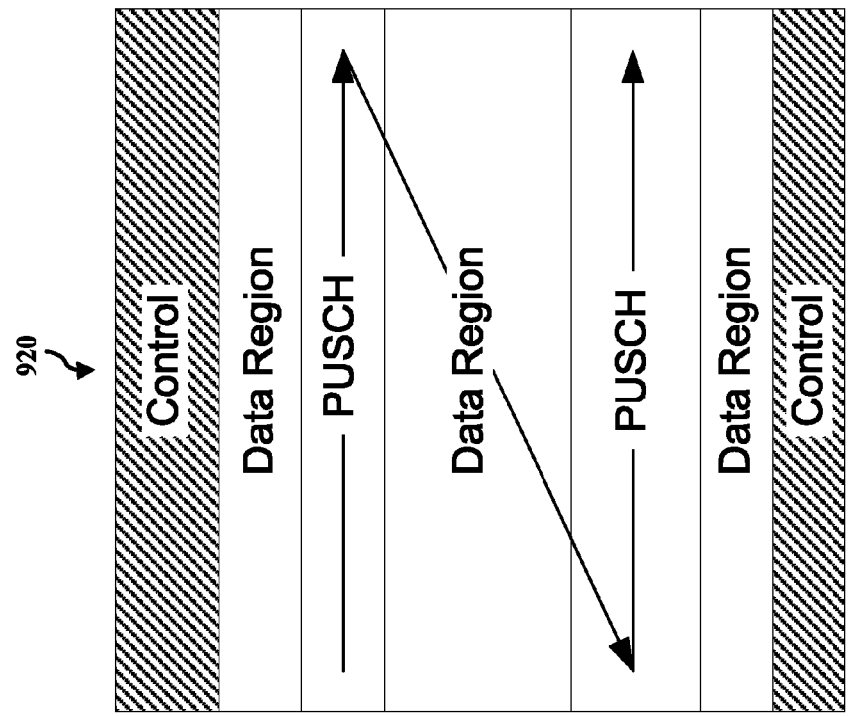
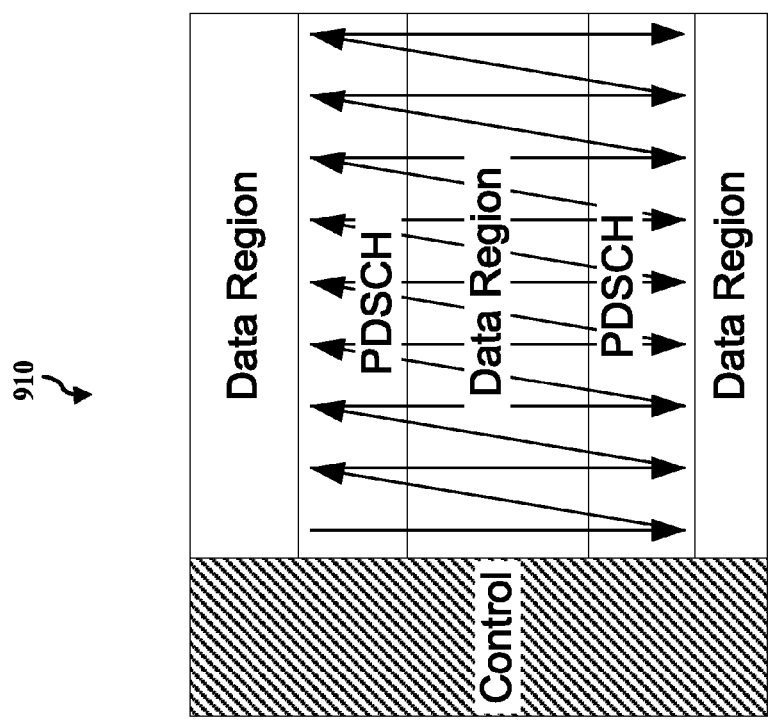
FIG. 9

DOWNLINK AND UPLINK RESOURCE ELEMENT MAPPING FOR CARRIER EXTENSION

CROSS-REFERENCE TO RELATED APPLICATION

This application claims the benefit of U.S. Provisional Application Ser. No. 61/252,115, entitled "DOWNLINK AND UPLINK RESOURCE ELEMENT MAPPING FOR CARRIER EXTENSION IN LONG TERM EVOLUTION SYSTEMS," filed on Oct. 15, 2009, which is expressly incorporated by reference herein in its entirety.

BACKGROUND

1. Field

The present disclosure relates generally to communication systems, and more particularly, to the mapping of resource elements in radio frames.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

A method, an apparatus, and a computer program product for wireless communication are provided in which resource elements compatible with multiple different communication protocols, which may not be compatible with one another, may be mapped to a radio frame. For example, in an LTE network, equipment configured to be compatible with 3GPP release 8 standards (herein referred to as R8) generally has certain limitations as to what bandwidth is available for use and access, while some of these limitations do not apply to later releases of LTE standards after Rel. 8 (herein referred to as "New"). Thus, a system bandwidth can be extended to include an extension portion, to which resource elements compatible with the New protocol may be mapped, and a non-extension portion, to which resource elements compatible with either Rel. 8 or the New protocol may be mapped, providing an effective multiplexing of system resources.

In an aspect of the disclosure, a method of wireless communication includes mapping first resource elements corresponding to a first protocol to a non-extension portion of a first frame such that an extension portion of the first frame is exclusive of the first resource elements, and mapping second resource elements corresponding to a second protocol to the extension portion and the non-extension portion of a second frame, wherein the extension portion of each of the first frame and the second frame respectively may include a bandwidth extension unavailable to a user equipment operating in accordance with the first protocol.

In another aspect of the disclosure, an apparatus for wireless communication includes means for mapping first resource elements corresponding to a first protocol to a non-extension portion of a first frame such that an extension portion of the first frame is exclusive of the first resource elements, and means for mapping second resource elements corresponding to a second protocol to the extension portion and the non-extension portion of a second frame, wherein the extension portion of each of the first frame and the second frame respectively may include a bandwidth extension unavailable to a user equipment operating in accordance with the first protocol.

In another aspect of the disclosure, a computer program product includes a computer-readable medium having instructions for causing a computer to map first resource elements corresponding to a first protocol to a non-extension portion of a first frame such that an extension portion of the first frame is exclusive of the first resource elements, and instructions for causing a computer to map second resource elements corresponding to a second protocol to the extension portion and the non-extension portion of a second frame, wherein the extension portion of each of the first frame and the second frame respectively may include a bandwidth extension unavailable to a user equipment operating in accordance with the first protocol.

In another aspect of the disclosure, an apparatus for wireless communication includes a processing system configured to map first resource elements corresponding to a first protocol to a non-extension portion of a first frame such that an extension portion of the frame is exclusive of the first resource elements, and map second resource elements corresponding to a second protocol to the extension portion and the non-extension portion of a second frame, wherein the extension portion of each of the first frame and the second frame respectively may include a bandwidth extension unavailable to a user equipment operating in accordance with the first protocol.

In another aspect of the disclosure, a method of wireless communication includes mapping resource elements to an extension portion of an uplink frame, and mapping resource elements to a non-extension portion of the uplink frame, where the non-extension portion includes a control portion and a data portion. Further, the method includes transmitting the uplink frame on an uplink, wherein the mapping of the resource elements to each of the extension portion and the non-extension portion follows a time-first, frequency-second mapping order that skips over the control portion of the non-extension portion.

BRIEF DESCRIPTION OF THE DRAWINGS

FIG. 9 is a diagram illustrating examples of mapping the PDSCH and PUSCH channels in downlink and uplink subframes, respectively, in accordance with the LTE Rel. 8 protocol.

DETAILED DESCRIPTION

Figure 1:
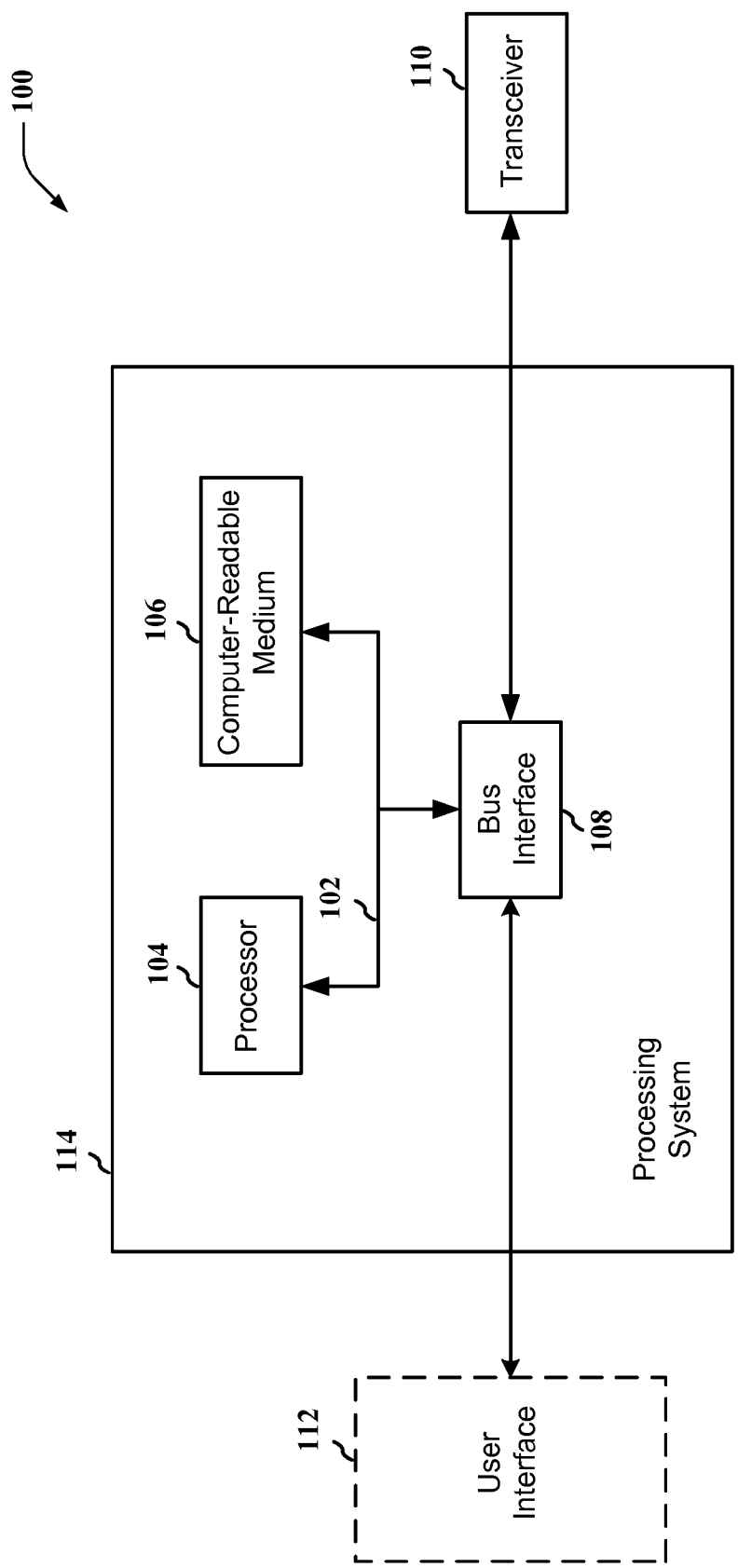
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a block diagram of an exemplary hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
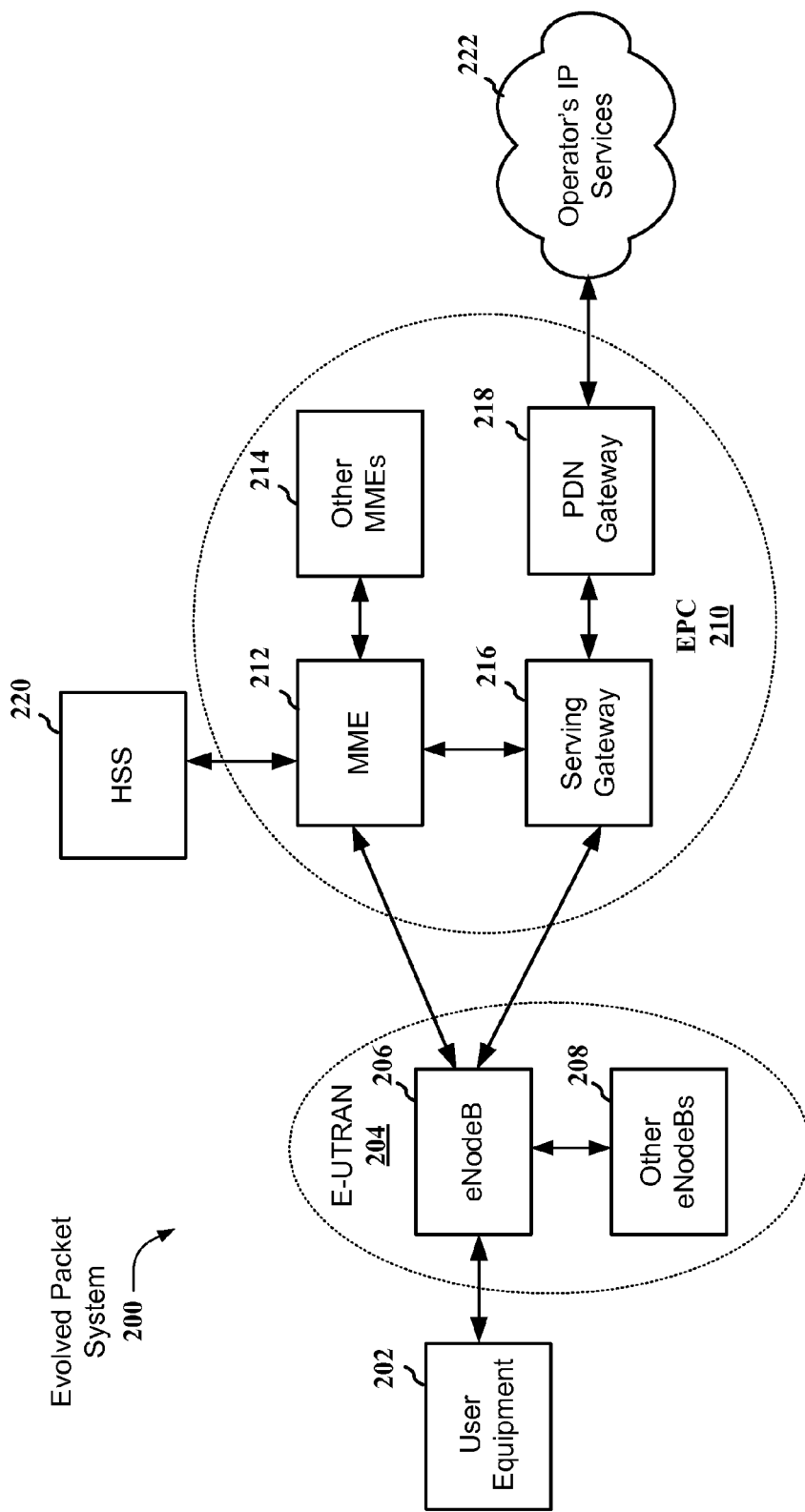
FIG. 2 is a diagram illustrating an example of a network architecture.

FIG. 2 is a diagram illustrating an LTE network architecture 200. The LTE network architecture 200 may be referred to as an Evolved Packet System (EPS) 200. The EPS 200 may include one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services. The various elements of EPS 200 may include apparatuses 100 as described in connection with FIG. 1.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 222. The Operator's IP Services 222 include the Internet, the Intranet, an IP Multimedia Subsystem (IMS), and a PS Streaming Service (PSS).

Figure 3:
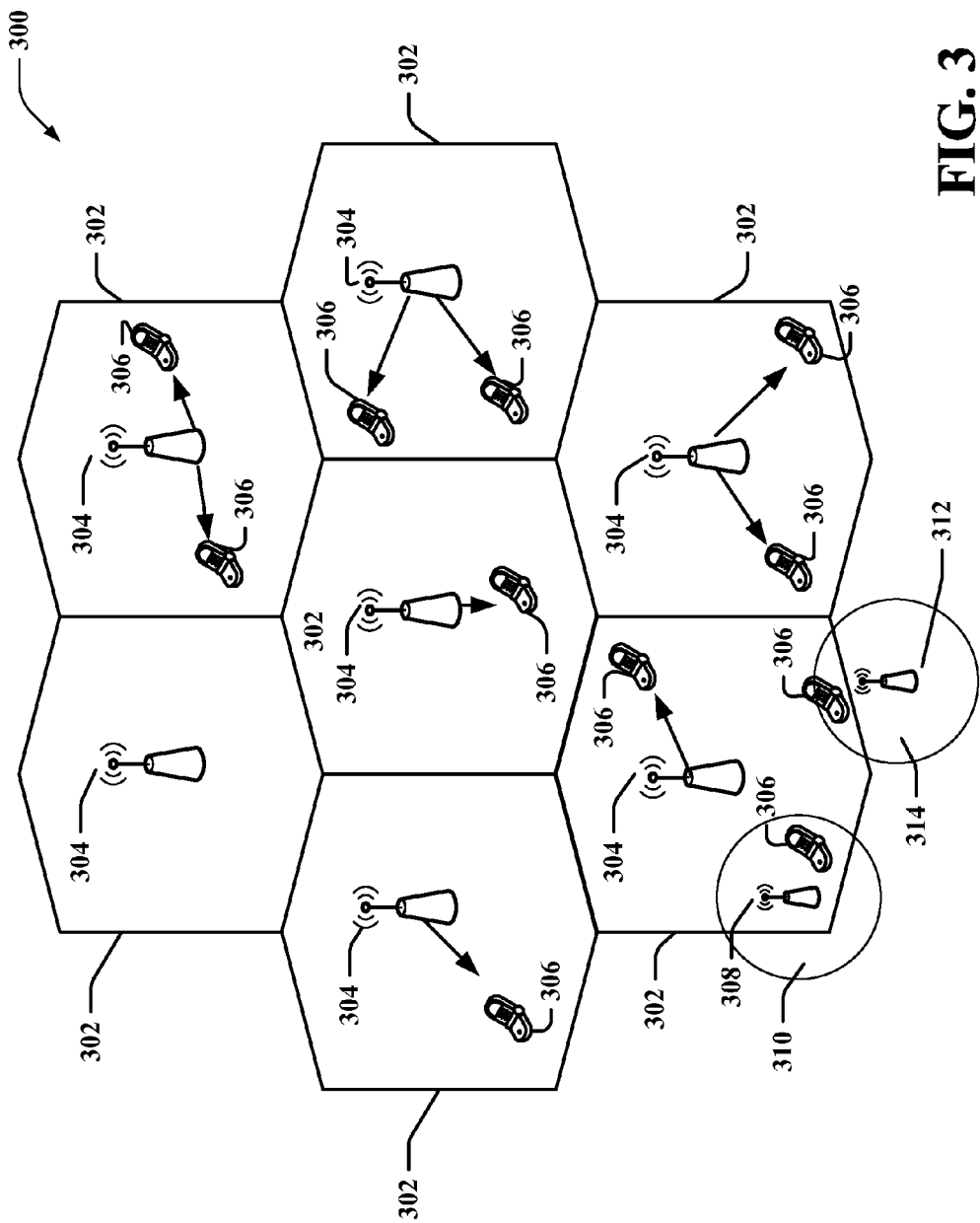
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Various frame structures may be used to support the DL and UL transmissions. An example of a structure of a frequency division duplex (FDD) DL radio frame 414 will now be presented with reference to FIG. 4. However, as those skilled in the art will readily appreciate, the structure of the radio frame 414 for any particular application may be different depending on any number of factors. In this example, a 10 ms radio frame 414 is divided into ten 1 ms subframes 412.

In a conventional LTE design (e.g., one following the 3GPP Release 8 standard, herein referred to as the Rel. 8 protocol), each subframe is further divided into two 0.5 ms time slots 410, and each time slot 410 consists of a number of OFDM symbols. This number may typically be 6 or 7 OFDM symbols, corresponding to an extended Cyclic Prefix and a normal Cyclic Prefix. Each resource block 408 further is divided in the frequency domain into a number of subcarriers 416, which may be spaced at 7.5 kHz or 15 kHz in different configurations. The total number of subcarriers depends on the channel bandwidth.

A typical resource block 408 may include 12 subcarriers 416 spaced at 15 kHz, utilizing 180 kHz bandwidth for each resource block 408. Depending on the channel bandwidth, each slot may include one of six different numbers of resource blocks (RBs) 408 (i.e., 6, 15, 25, 50, 75, or 100 resource blocks 408). Further, to reduce or avoid interference with adjacent bands, there may be a guard band of up to about 1 MHz at each edge of the OFDMA signal where no RF transmission is typically provided.

A resource grid may be used to represent two adjacent resource blocks 408 in adjacent time slots 410. Here, the resource grid is divided into multiple resource elements 406. In LTE, a resource block 408 may contain 12 consecutive subcarriers 416 in the frequency domain and, for a normal cyclic prefix in each OFDM symbol, 7 consecutive OFDM symbols 418 in the time domain, or 84 resource elements 406. That is, a resource element 406 is essentially one subcarrier and one OFDM symbol. A modulation symbol, which represents the number of data bits, is mapped to one resource element 406. The number of bits carried by each resource element 406 depends on the modulation scheme. Thus, the more resource blocks 408 that a UE receives and the higher the modulation scheme, the higher the data rate for the UE.

Figure 4:
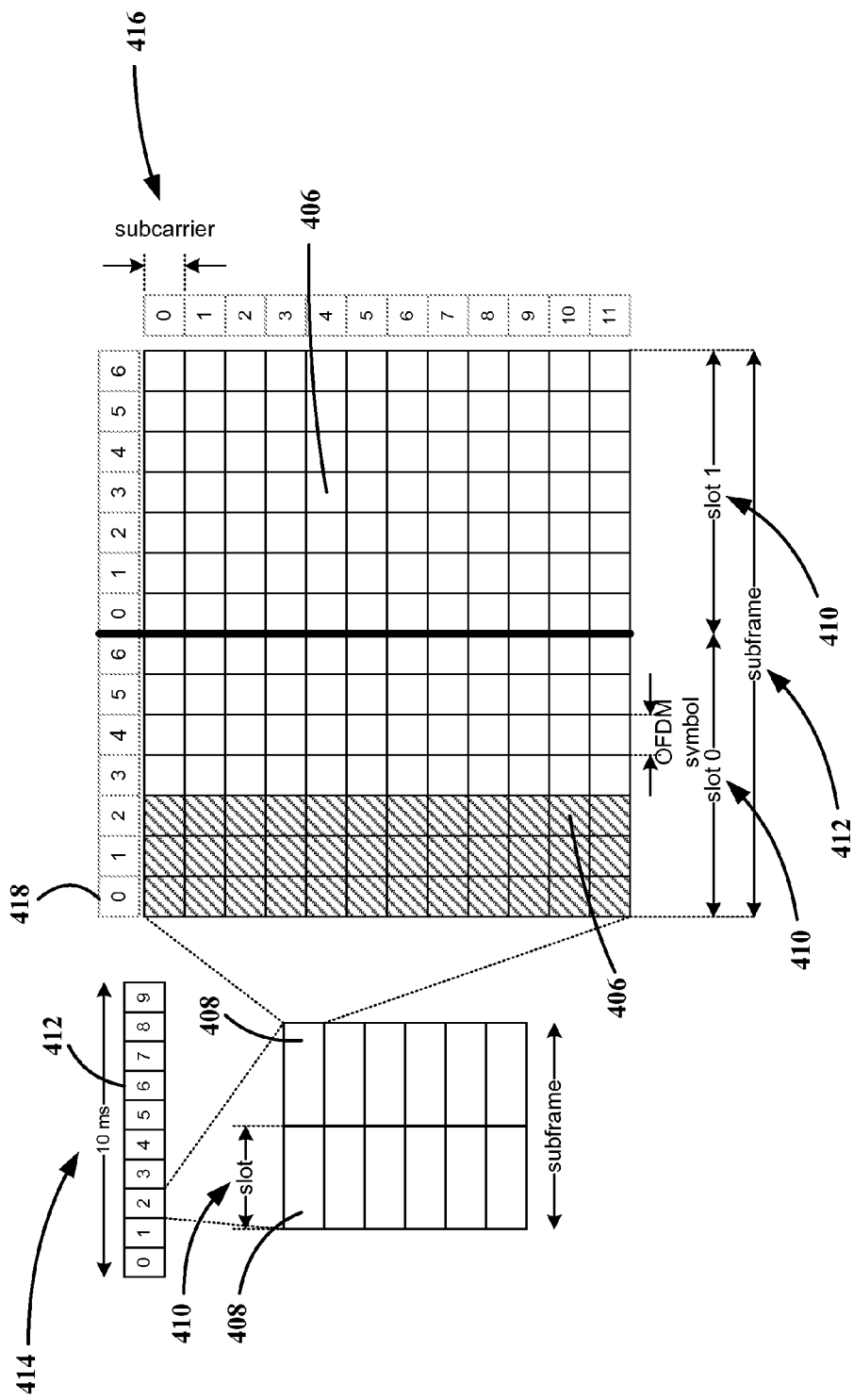
FIG. 4 is a diagram illustrating an example of a downlink frame structure for use in an access network.
Figure 5:
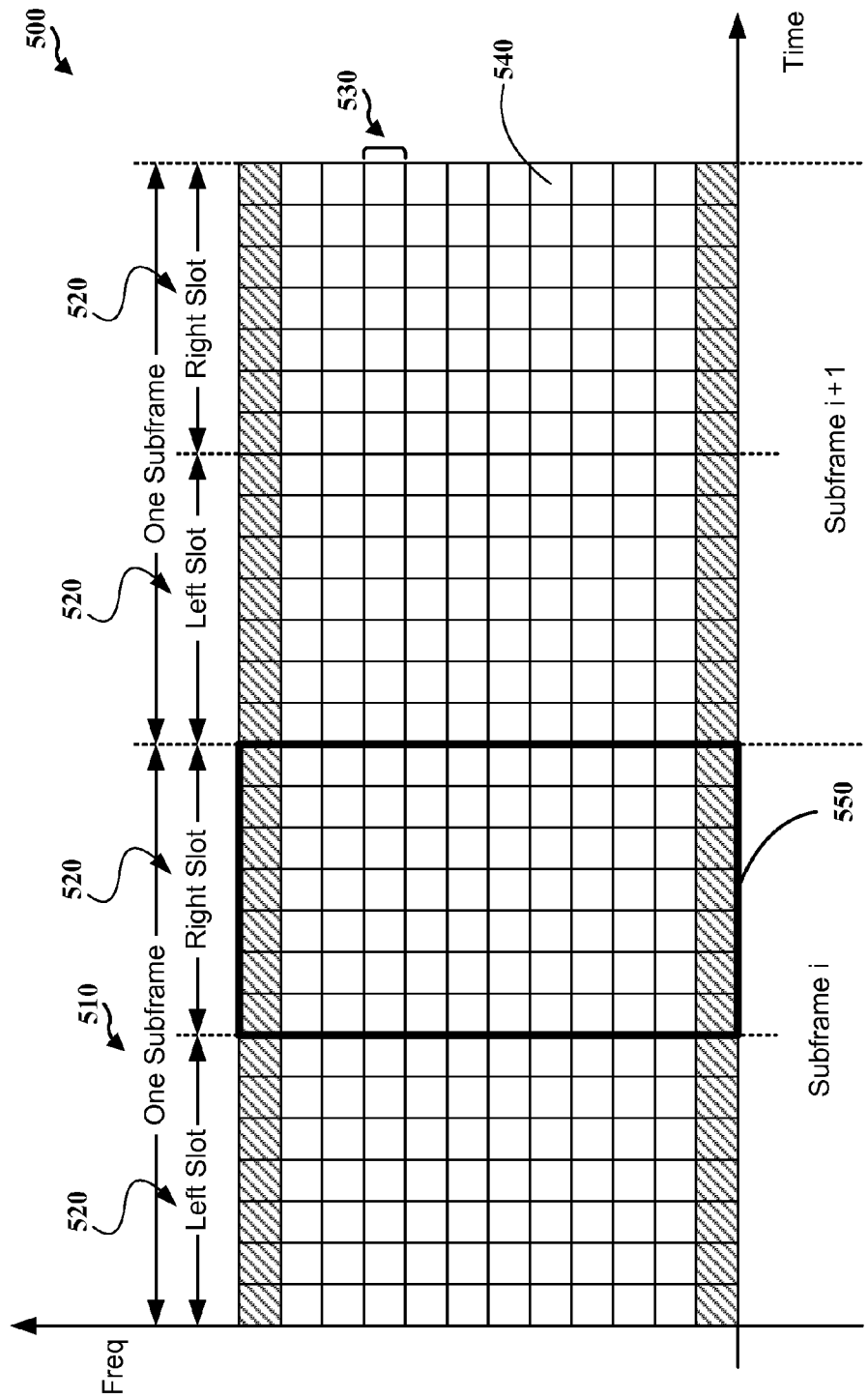
FIG. 5 is a diagram illustrating an example of an uplink frame structure for use in an access network.

An example of an FDD UL radio frame structure 500 will now be presented with reference to FIG. 5. Similar to the DL radio frame structure illustrated in FIG. 4, the UL radio frame 500 may include two subframes 510 each including two slots 520. Further, the radio frame 500 may be divided in frequency into a number of subcarriers 530, such that resource elements 540 include one OFDM symbol and one subcarrier. Resource blocks 550 are blocks of resource elements 540 in one slot.

In the examples of FIGS. 4 and 5, each time slot may be configured to include certain numbers of resource blocks (i.e., 6, 15, 25, 50, 75, or 100 resource blocks, corresponding to system bandwidths of approximately 1.4, 3, 5, 10, 15, and 20 MHz bandwidths). Thus, when an eNB is deployed, it typically adopts one of these system bandwidths and transmits signals accordingly. However, as the 3GPP standards continue to evolve to future releases beyond Rel. 8 (herein referred to as the "New" protocol, which may include LTE release 9 or higher, LTE Advanced, etc.), other numbers of resource blocks, including any number of resource blocks from 6 up to 110 or more resource blocks may be allocated to a particular carrier. For example, the guard bands described above at the edges of the signal may be utilized to carry additional resource blocks.

An issue with the utilization of numbers of resource blocks other than the certain numbers described above is that the transmissions may no longer be backwards-compatible. That is, if an eNB utilizing the New LTE protocol signals a value other than the six possible system bandwidths described above, a UE configured according to the Rel. 8 protocol may not be able to handle the request. However, to increase throughput it may be desired to utilize the increased available system bandwidth in New eNB deployments.

Figure 6:
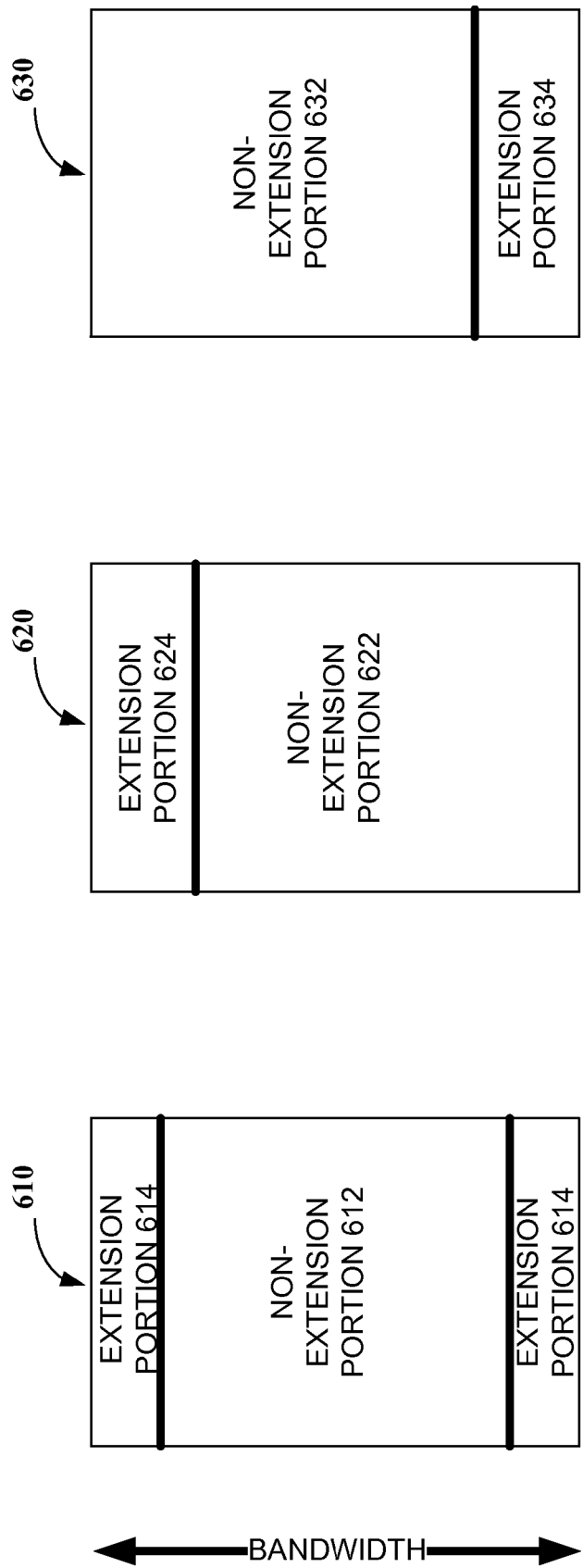
FIG. 6 is a diagram illustrating different interpretations of bandwidth extension in a New LTE protocol network.

FIG. 6 illustrates examples of subframes having a bandwidth extension wherein an extended bandwidth, i.e., a greater number of RBs or a number of RBs that differs from Rel. 8 system bandwidth configurations, is utilized for transmission by an eNB. In the first extended bandwidth 610, a non-extension portion 612 includes one of the above-described, conventionally specified number of RBs corresponding to a Rel. 8 standard system bandwidth. As such, the non-extension portion is recognized by a UE that is configured for the Rel. 8 protocol. The first extended bandwidth 610 further includes extension portions 614 that are evenly distributed at the edges of the non-extension portion 612, such that the non-extension portion 612 is centered between the extension portions 614. An LTE Rel. 8 UE would not look to these extension portions 614, as they fall outside of the standard system bandwidths and might therefore be regarded by a Rel. 8 UE as guard band. However, a New LTE UE configured to be compatible, for example, with later releases of 3GPP standards, would recognize the extension portions 614, thus increasing the throughput for the New LTE UE. Bandwidths 620 and 630 respectively illustrate other examples to show that the extension portions 624 and 634 need not symmetrically surround the non-extension portion 622 and 632, but may be on either side of the non-extension portion. Of course, other configurations may be utilized within the scope of this disclosure.

In this way, an LTE Rel. 8 UE may be signaled to utilize the RBs within the non-extension portion, and a UE configured according to the New LTE protocol (a "New UE") may be signaled of the availability of RBs in the extension portion. In this way, the extension portions of the system bandwidth are only available to the New UEs, and an eNB can maintain backward compatibility with LTE Rel. 8 UEs while providing improved throughput to New UEs.

Figure 7:
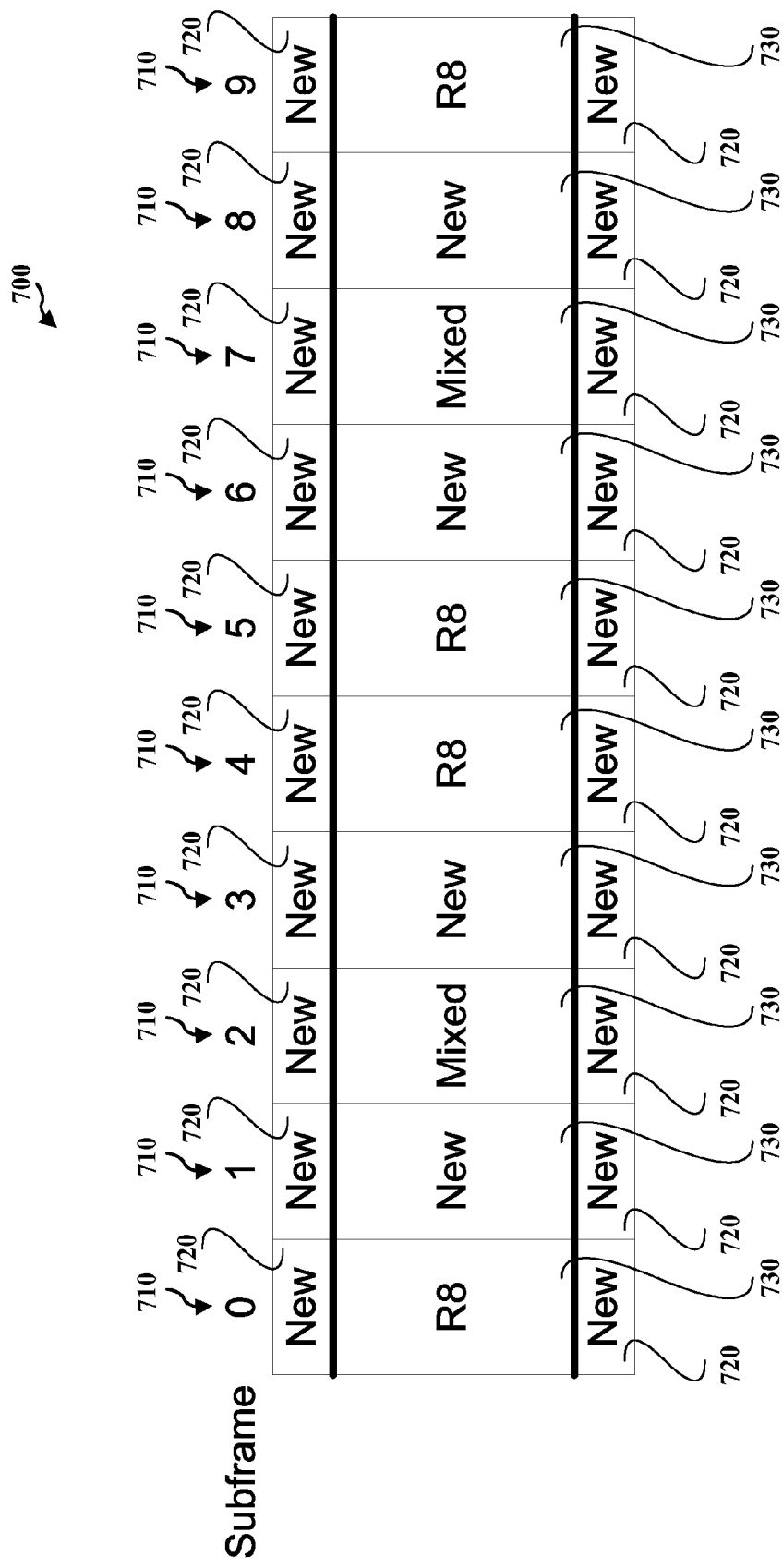
FIG. 7 is a diagram illustrating a radio frame multiplexing information utilizing LTE Rel. 8 and New LTE protocols.

FIG. 7 illustrates a radio frame 700 which may be applicable for either an uplink or downlink transmission. In some examples, the illustrated radio frame 700 may be provided on one of a plurality of carriers. Here, the radio frame 700 includes ten subframes 710, each subframe 710 having a bandwidth including an extension portion 720 and a non-extension portion 730 to enable multiplexing for LTE Rel. 8 UEs configured in accordance with 3GPP Release 8 specifications, and New LTE UEs configured in accordance with later releases of 3GPP specifications. Here, the radio frame 700 takes the symmetric configuration of the bandwidth 610 illustrated in FIG. 6, however, other configurations are possible within the scope of this disclosure.

Returning to FIG. 7, the illustrated bandwidth may be considered to provide the extension portions 720 at the edges of the non-extension portion 730, i.e., within the guard band or adjacent to a standard system bandwidth for Rel. 8 UEs.

For example, with a carrier having 20 MHz of system bandwidth, Rel. 8 UEs may utilize 100 RBs, while New UEs may utilize up to 110 RBs. Here, the non-extension portions 730 of subframes 0, 4, 5, and 9 are configured to include data addressed to Rel. 8 UEs only; the non-extension portions 730 of subframes 1, 3, 6, and 8 are configured to include data addressed to New UEs only; and the non-extension portions 730 of subframes 2 and 7 are configured to include data addressed to a mix of Rel. 8 and New UEs. Of course, data in each of the extension portions 720 includes data exclusively addressed to New UEs, as these extension portions 720 are not accessible by Rel. 8 UEs, as described above. The particular layout of these subframes is only given here as an illustrative example; other sequences of data in the non-extension portions 730 may be utilized, or alternatively, all the non-extension portions may be reserved for Rel. 8 data, or they may all be mixed Rel. 8 and New data. In any case, the above-described radio frame 700 provides for multiplexing of data directed for Rel. 8 and New UEs, while providing for improved throughput for New UEs by way of the extension portions 720.

In the radio frame 700, for resources dedicated to New UEs only (i.e., the extension portions 720 in subframes 0, 2, 4, 5, 7, and 9, and the entire bandwidth in subframes 1, 3, 6, and 8), a Rel. 8-type control channel structure is not needed. Indeed, for the extension portions 720, it may be desired not to transmit any control information at all, reserving these portions for data transmissions. That is, in an exemplary aspect of the disclosure, scheduling for New UEs can rely on Rel. 8 control channels in the non-extension portion 730 of a radio frame.

Referring back to FIG. 4, in the LTE Rel. 8 specifications, within each downlink subframe 412, downlink control signaling may be located in the first n OFDM symbols 418, where n≤3 for large system bandwidths (>10 resource blocks), and n≤4 otherwise. For example, the downlink control signaling may be located in OFDM symbols 0, 1, and 2 within the slot 410 labeled slot 0. The remaining OFDM symbols in the subframe (i.e., OFDM symbols 3-6 in slot 0 and OFDM symbols 0-6 in slot 1) are available as a data region.

Figure 8:
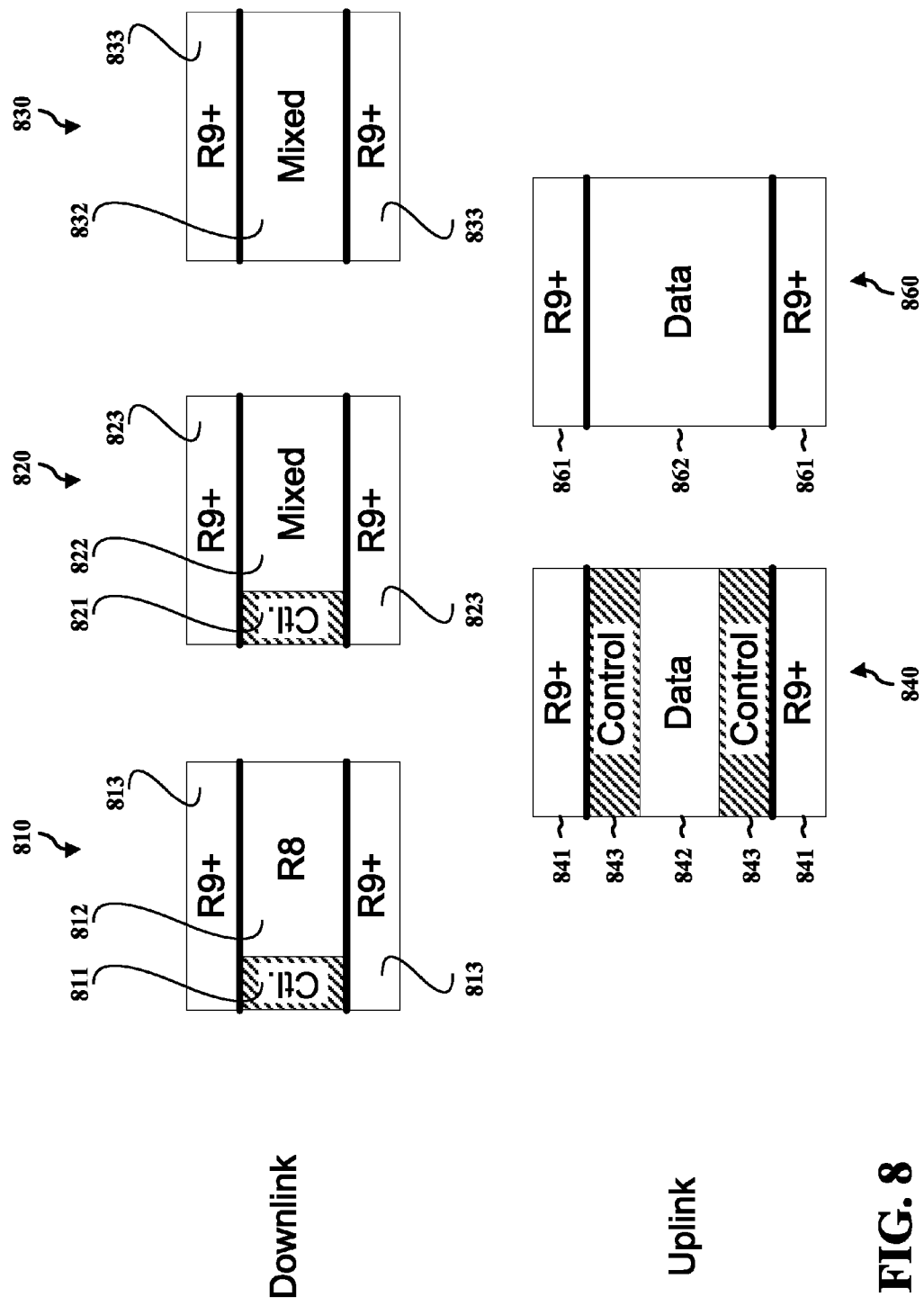
FIG. 8 is a diagram illustrating various configurations for an LTE Rel. 8 protocol control region.

FIG. 8 illustrates several backwards-compatible subframes 810-860 showing some examples of a control channel structure in accordance with various aspects of the disclosure. Subframes 810, 820, and 830 illustrate downlink subframes and subframes 840 and 860 illustrate uplink subframes. In subframe 810, a non-extension portion includes a control channel portion 811 and a data portion 812. The data portion 812 in this example is limited to information directed to legacy LTE Rel. 8 UEs. Subframe 820 includes an extension portion 823 and a non-extension portion, including a control channel portion 821 and a data portion 822. Here, the data portion 822 includes a mix of information directed to Rel. 8 UEs and information directed to New UEs. Subframe 830 includes an extension portion 833 and a non-extension portion 832 that lacks a control portion, such that all of the OFDM symbols are dedicated to a data portion for a mix of Rel. 8 and New data. In each of these subframes 810, 820, and 830, the respective extension portions include data for New UEs without any Rel. 8 control portion. Similarly, for the uplink, subframe 840 includes an extension portion 841 and a non-extension portion including a control channel portion 843 and a data portion 842. Subframe 860 includes an extension portion 861 and a non-extension portion including a data portion 862.

As illustrated in FIG. 8, the control channel structure in the backward-compatible downlink subframes 810, 820, and 830 may not span over the entire bandwidth in the subframe; rather, the control channel structure may be limited to the non-extension portion. As will be seen below, this structure presents certain issues dealing with mapping resource elements for data channels such as the PDSCH. Similarly, in the uplink subframes 840 and 860, the mapping of resource elements must be considered when including the extension portions.

FIG. 9 illustrates conventional (i.e., in accordance with 3GPP Release 8 specifications) resource element mapping for the PDSCH in a downlink subframe 910, and for the PUSCH in an uplink subframe 920. For a downlink subframe 910, mapping resource elements for a particular transmit antenna port is in increasing order of first the frequency index, then the time index, starting with the first slot for PDSCH in a subframe. That is, PDSCH is mapped in a frequency-first, time-second fashion, as illustrated by the arrows advancing first vertically in frequency, then horizontally in time. Specifically, for a downlink subframe 910, resource elements are allocated to the earliest OFDM symbol in time in increasing index of frequency to fill all the available subcarriers; when all the available subcarriers are filled with resource elements, the next resource element is mapped to the next OFDM symbol in time after the earliest OFDM symbol and the first frequency subcarrier, with following resource elements mapped in increasing index of frequency at that OFDM subcarrier, and so on. As can be seen in the downlink subframe 910, the control portion is skipped, as it is exclusive of the PDSCH.

For an uplink subframe 920, mapping resource elements is in increasing order of first the time index, then the frequency index. That is, PUSCH is mapped in a time-first, frequency-second fashion, as illustrated by the arrows advancing first horizontally in time, then vertically in frequency. Specifically, for an uplink subframe 920, resource elements are allocated to the lowest subcarrier index in increasing index of OFDM symbol; when all the available OFDM symbol indices are filled with resource elements, the next resource element is mapped to the next subcarrier index after the lowest subcarrier index with following resource elements mapped in increasing index of OFDM symbol, and so on. As can be seen in the uplink subframe 920, the control portion is skipped, as it is exclusive of the PUSCH.

Figure 10:
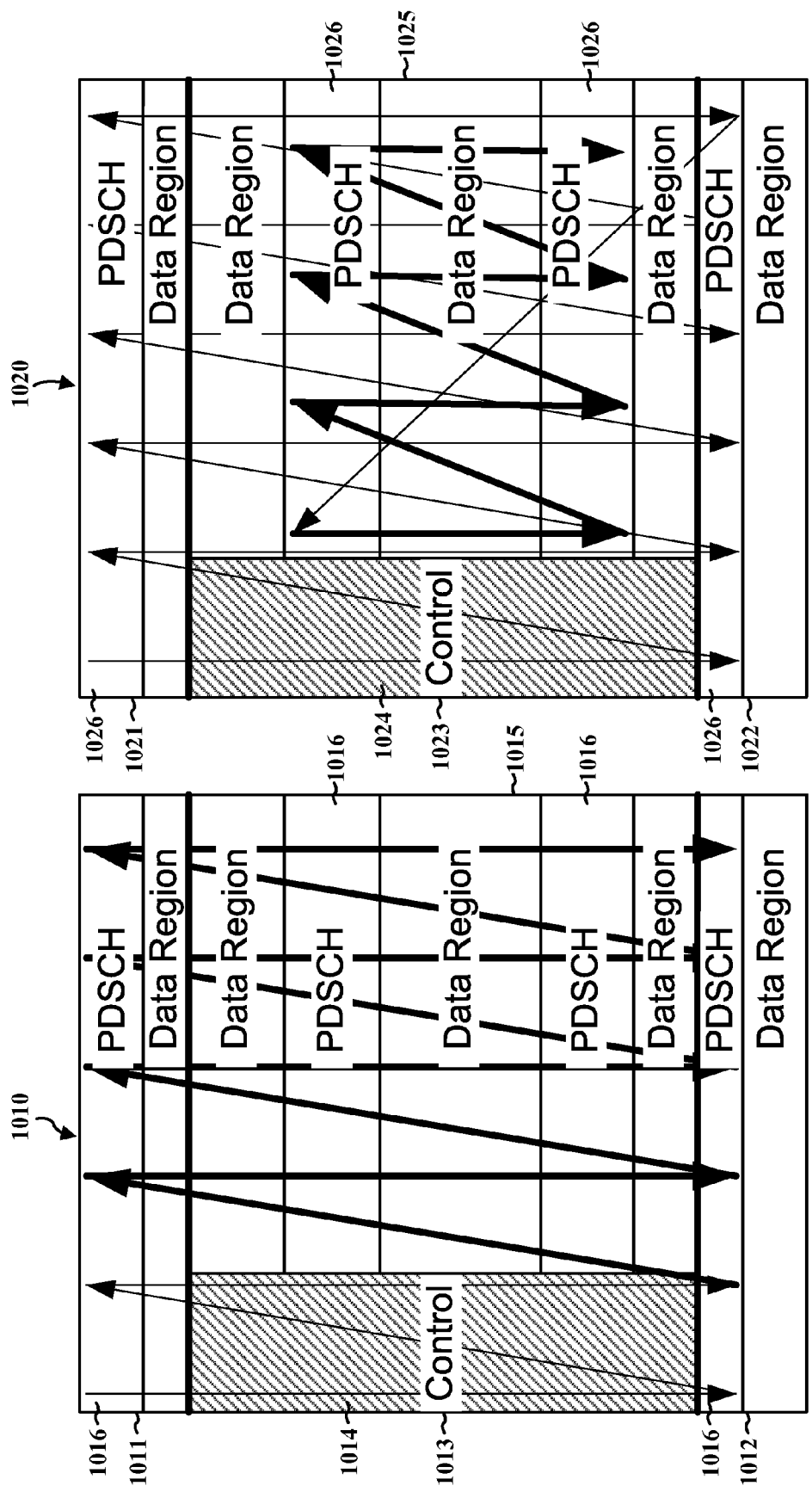
FIG. 10 is a diagram illustrating examples of mapping the PDSCH in accordance with the multiplexing of LTE Rel. 8 and New LTE protocols in accordance with aspects of the disclosure.

FIG. 10 illustrates the mapping of resource elements to a PDSCH in downlink subframes utilizing carrier extension in accordance with two exemplary aspects of the disclosure. Here, the term frequency-first time-second mapping refers broadly to a general process that may locally follow frequency-first, time-second mapping, for example, within the non-extension portion. That is, the term includes discontinuities in the mapping, for example, when the extension portion is treated separately from the non-extension portion in such cases where the mapping to the extension portions is performed before or after the mapping to the non-extension portions. Similarly, the term time-first frequency-second mapping broadly includes mapping that may locally follow time-first, frequency second, but may include discontinuities in the mapping, for example, where certain regions such as the extension portions and non-extension portion are treated separately.

In either of the illustrated embodiments in FIG. 10, in accordance with various aspects of the disclosure, the resource elements mapped to an extension portion are reserved exclusively for information directed to a New UE, while resource elements mapped to a non-extension portion may be LTE Rel. 8 UEs, New LTE UEs, or a mix of the two. Here, mapping of resource elements to the PDSCH may be performed in any of several different ways in accordance with various aspects of the disclosure.

For example, a first downlink subframe 1010 includes a first extension portion 1011, a second extension portion 1012, and a non-extension portion 1013. The non-extension portion includes a control region 1014 and a data region 1015. At least a portion of the data region 1015 is allocated to the PDSCH 1016. In the illustration, each of the extension portions 1011 and 1012 includes a PDSCH 1016, however, the allocation of the PDSCH 1016 within the data region may take many other forms as understood by those having ordinary skill in the art. For example, in the first subframe 1010, the mapping of resource elements is accomplished in a frequency-first, time-second fashion, as in the Rel. 8 subframe illustrated in FIG. 9; however, here, the placement of the resource elements begins in the first extension portion 1011. Here, because both extension portions 1011 and 1012 include PDSCH 1016, after resource elements fill all of the available subcarriers at the OFDM slot having the lowest index in the first extension portion 1011, the mapping of the next resource element skips over the non-extension portion 1013 (indicated by the thinner arrows), since the non-extension portion 1013 includes the control region 1014, which is exclusive of the PDSCH 1016. Thus, the next resource element is mapped to the PDSCH 1016 in the second extension portion 1012. When all the available subcarriers at the OFDM slot having the lowest index in the second extension portion 1012 are filled with resource elements, the mapping advances to the next OFDM symbol index and returns to the first extension portion 1011. This process continues similarly, until the mapping exceeds the number of OFDM symbol indices corresponding to the number of OFDM symbol indices occupied by the control region 1014 in the non-extension portion 1013. At this point, the mapping of resource elements is allocated to the extension portion 1011 as well as the non-extension portion along all available subcarriers, indicated by the thicker arrows. Thus, this aspect of the disclosure is generally a frequency-first, time-second mapping of resource elements, while skipping over the control region 1014 of the non-extension portion 1013.

In another example, a second downlink subframe 1020 includes a first extension portion 1021, a second extension portion 1022, and a non-extension portion 1023. The non-extension portion includes a control region 1024 and a data region 1025. At least a portion of the data region 1025 is allocated to the PDSCH 1026. In the illustration, each of the extension portions 1021 and 1022 includes a PDSCH 1026, however, the allocation of the PDSCH 1026 within the data region may take many other forms as understood by those having ordinary skill in the art. Here, the mapping of resource elements to the PDSCH 1026 is accomplished in a frequency-first, time-second fashion, wherein the extension portions 1021 and 1022 are treated separately from the non-extension portion 1023. That is, in accordance with an aspect of the disclosure, the extension portions 1021 and 1022 may be mapped first while skipping over the entire non-extension portion 1023 (as illustrated by the thinner arrows), after which by the non-extension portion 1023 is mapped in a similar frequency-first time-second fashion (as illustrated by the thicker arrows). Of course, those skilled in the art will comprehend that other mapping orders, such as mapping a non-extension portion first followed by an extension portion, etc., may be utilized within the scope of this disclosure.

Figure 11:
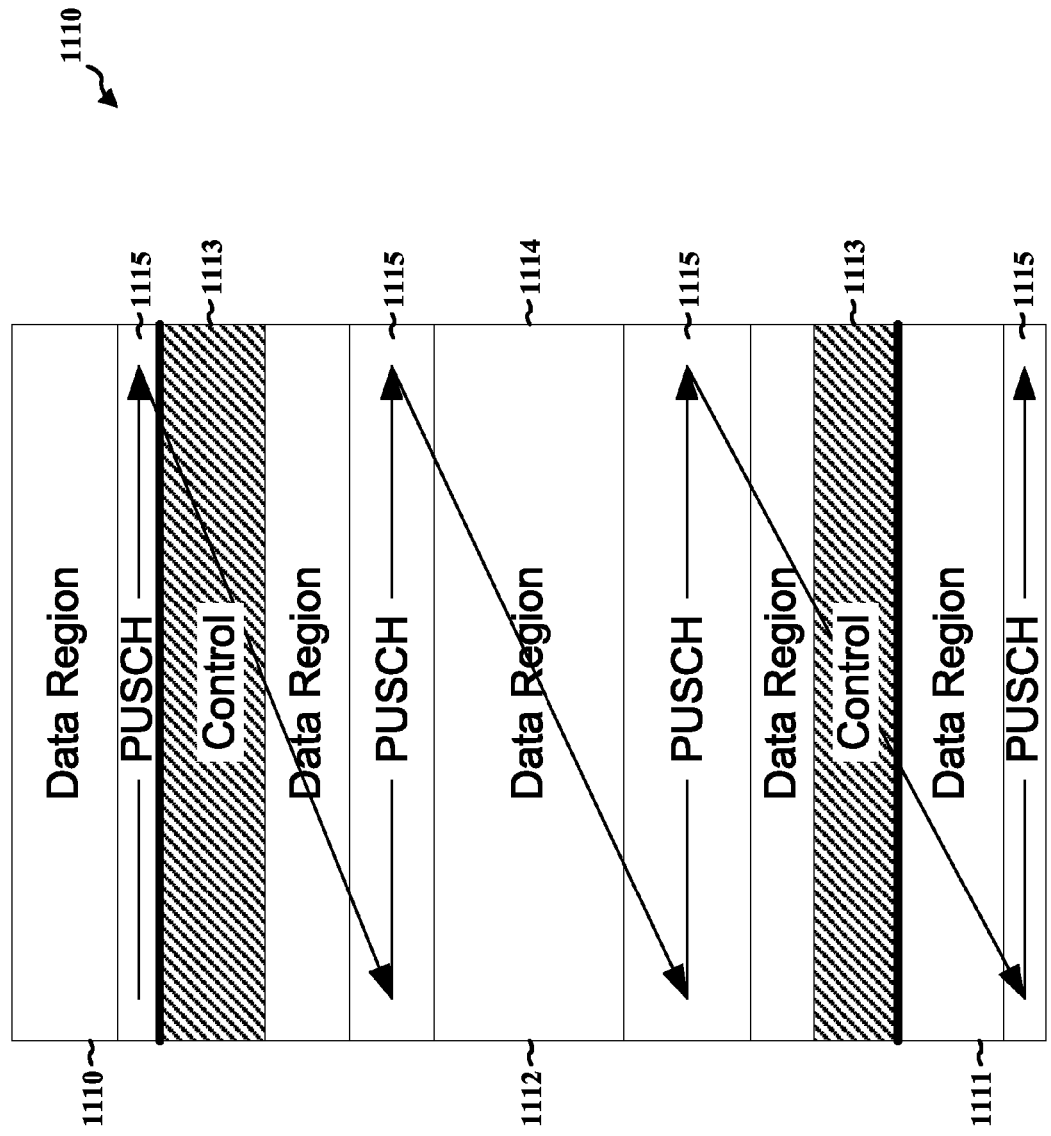
FIG. 11 is a diagram illustrating an example of mapping the PUSCH in accordance with the multiplexing of LTE Rel. 8 and New LTE protocols in accordance with aspects of the disclosure.

FIG. 11 illustrates the mapping of resource elements to a PUSCH in an uplink subframe 1100 utilizing carrier extension in accordance with an exemplary aspect of the disclosure. Here, the uplink subframe 1100 includes a first extension portion 1110, a second extension portion 1111, and a non-extension portion 1112, and the non-extension portion 1112 includes a control region 1113 and a data region 1114. At least a portion of the data region 1114 is allocated to the PUSCH 1115. Further, the extension portions 1110 and 1111 are data regions, at least a portion of which may be allocated to the PUSCH 1115. In the illustrated example, each of the first extension portion 1110 and the second extension portion 1111 includes a PUSCH 1115, however, those of ordinary skill in the art will understand that this is not necessarily the case, and other channels may be allocated within the extension portions and the non-extension portion.

Here, mapping of resource elements is accomplished in a time-first, frequency-second mapping, as illustrated by the arrows advancing first horizontally in time, then vertically in frequency. Specifically, for an uplink subframe 1110 with carrier extension, resource elements are allocated to the lowest subcarrier index in increasing index of OFDM symbol; and when all the available OFDM symbol indices are filled with resource elements, the next resource element is mapped to the next subcarrier index after the lowest subcarrier index with following resource elements mapped in increasing index of OFDM symbol, and so on. As can be seen in the uplink subframe 1110, the control portion is skipped, as it is exclusive of the PUSCH. Further, the extension portions 1110 and 1111 are treated in substantially the same way as the non-extension portion 1112, wherein the subcarrier index is treated as continuous across the extension portions 1110 and 1111 and the non-extension portion 1112.

In another aspect of the disclosure, the extension portions 1110 and 1111 can be treated separately from the non-extension portion 1112, such that resource element mapping to the PUSCH can be performed in the non-extension portion 1112 first, followed by the extension portions 1111 and 1112, or vice-versa.

Figure 12:
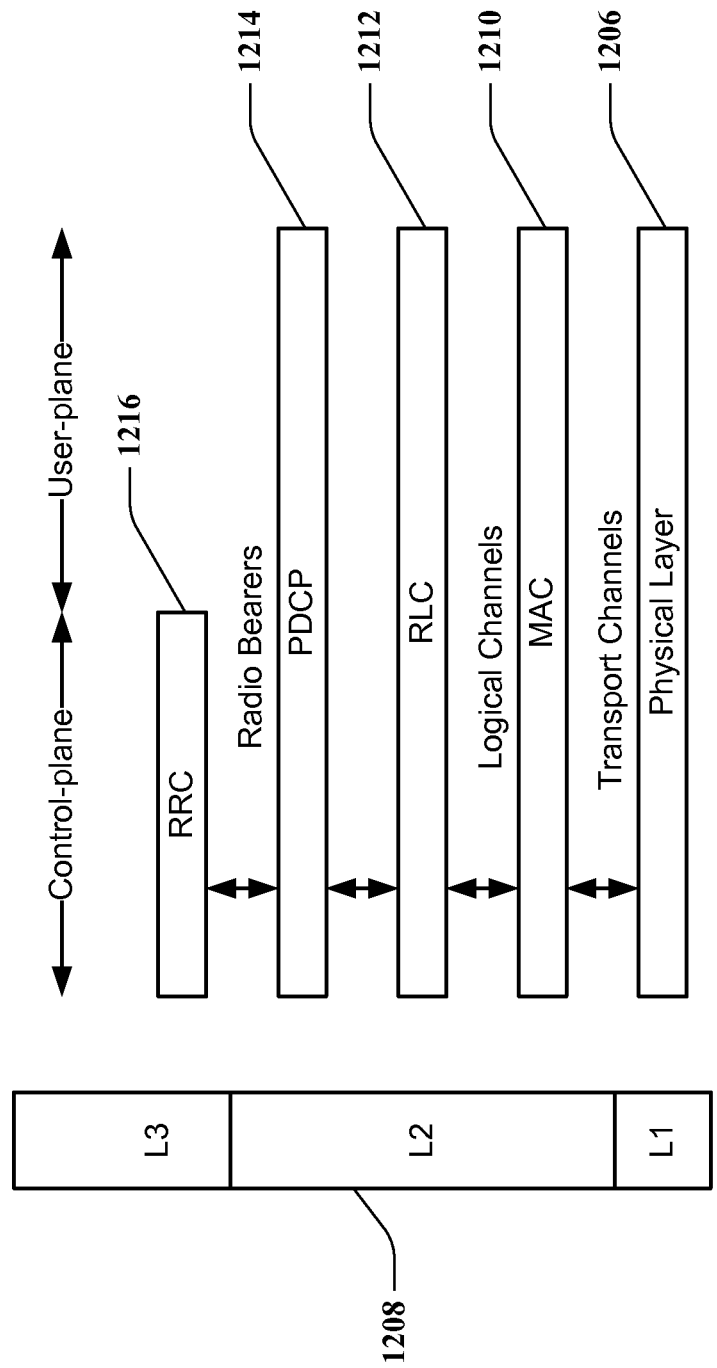
FIG. 12 is a diagram illustrating an example of a radio protocol architecture for the user and control plane.

The radio protocol architecture in accordance with the various aspects of the disclosure may take on various forms depending on the particular application. An example for an LTE system will now be presented with reference to FIG. 12. FIG. 12 is a diagram illustrating an example of the radio protocol architecture for the user and control planes.

Turning to FIG. 12, the radio protocol architecture for the UE and the eNB is shown with three layers: Layer 1, Layer 2, and Layer 3. Layer 1 is the lowest layer and implements various physical layer signal processing functions. Layer 1 will be referred to herein as the physical layer 1206. Layer 2 (L2 layer) 1208 is above the physical layer 1206 and is responsible for the link between the UE and eNB over the physical layer 1206.

In the user plane, the L2 layer 1208 includes a media access control (MAC) sublayer 1210, a radio link control (RLC) sublayer 1212, and a packet data convergence protocol (PDCP) 1214 sublayer, which are terminated at the eNB on the network side. Although not shown, the UE may have several upper layers above the L2 layer 1208 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 1214 provides multiplexing between different radio bearers and logical channels. The PDCP sublayer 1214 also provides header compression for upper layer data packets to reduce radio transmission overhead, security by ciphering the data packets, and handover support for UEs between eNBs. The RLC sublayer 1212 provides segmentation and reassembly of upper layer data packets, retransmission of lost data packets, and reordering of data packets to compensate for out-of-order reception due to hybrid automatic repeat request (HARQ). The MAC sublayer 1210 provides multiplexing between logical and transport channels. The MAC sublayer 1210 is also responsible for allocating the various radio resources (e.g., resource blocks) in one cell among the UEs. The MAC sublayer 1210 is also responsible for HARQ operations.

In the control plane, the radio protocol architecture for the UE and eNB is substantially the same for the physical layer 1206 and the L2 layer 1208 with the exception that there is no header compression function for the control plane. The control plane also includes a radio resource control (RRC) sublayer 1216 in Layer 3. The RRC sublayer 1216 is responsible for obtaining radio resources (i.e., radio bearers) and for configuring the lower layers using RRC signaling between the eNB and the UE.

Figure 13:
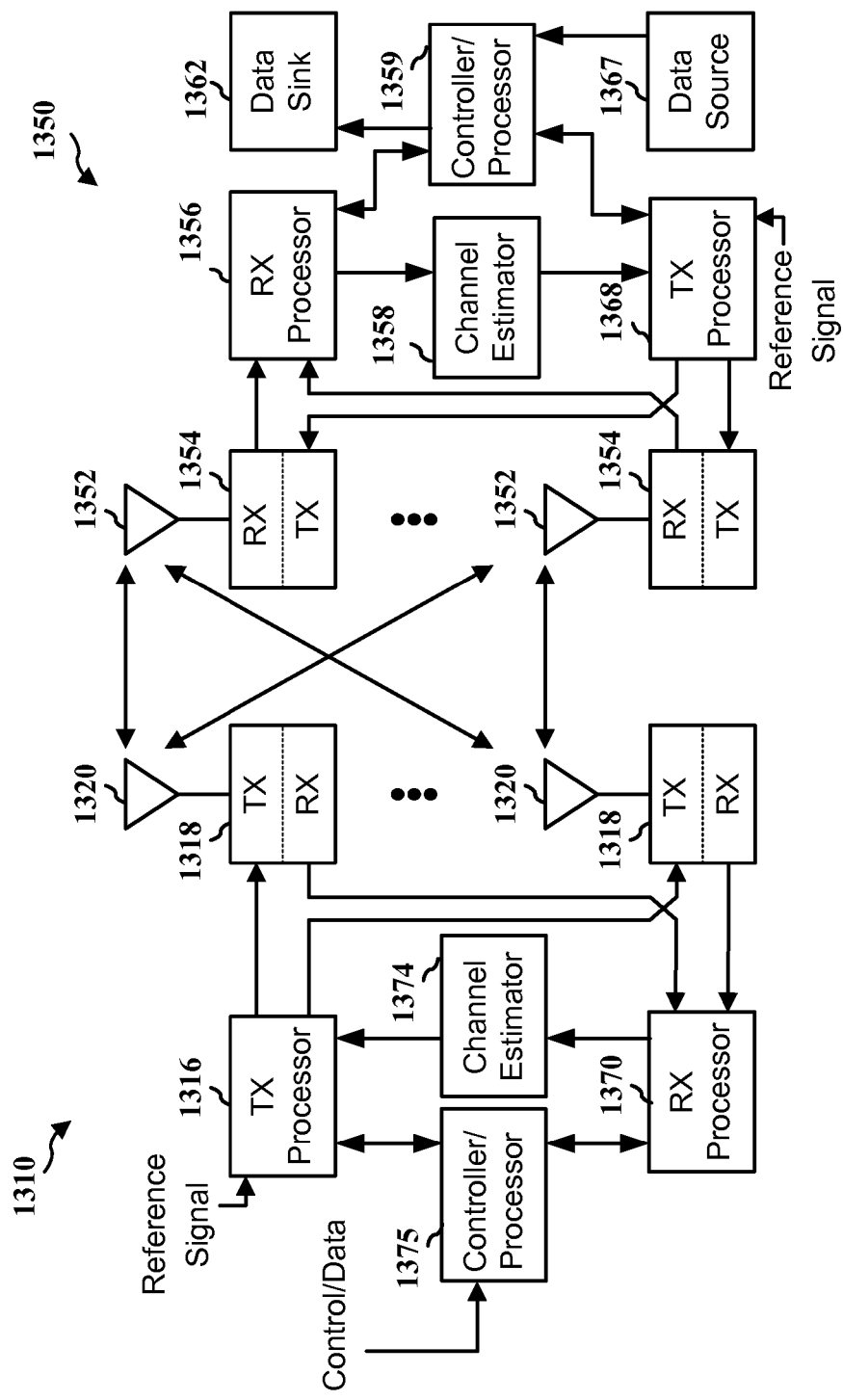
FIG. 13 is a block diagram illustrating an example of a UE in communication with an eNB in accordance with an aspect of the disclosure.

FIG. 13 is a block diagram of an eNB 1310 in communication with a UE 1350 in an access network. In the DL, upper layer packets from the core network are provided to a controller/processor 1375. The controller/processor 1375 implements the functionality of the L2 layer described earlier in connection with FIG. 12. In the DL, the controller/processor 1375 provides header compression, ciphering, packet segmentation and reordering, multiplexing between logical and transport channels, and radio resource allocations to the UE 1350 based on various priority metrics. The controller/processor 1375 is also responsible for HARQ operations, retransmission of lost packets, and signaling to the UE 1350.

The TX processor 1316 implements various signal processing functions for the L1 layer (i.e., physical layer). The signal processing functions may include coding and interleaving to facilitate forward error correction (FEC) at the UE 1350 and mapping to signal constellations based on various modulation schemes (e.g., binary phase-shift keying (BPSK), quadrature phase-shift keying (QPSK), M-phase-shift keying (M-PSK), or M-quadrature amplitude modulation (M-QAM)). The coded and modulated symbols may then be split into parallel streams. The TX processor 1316 may then map the streams of symbols to frames, e.g., by mapping each stream to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1374 may be used to determine the coding and modulation scheme, as well as for spatial processing. The channel estimate may be derived from a reference signal and/or channel condition feedback transmitted by the UE 1350. Each spatial stream may then be provided to a different antenna 1320 via a separate transmitter 1318TX. Each transmitter 1318TX modulates an RF carrier with a respective spatial stream for transmission.

At the UE 1350, each receiver 1354RX receives a signal through its respective antenna 1352. Each receiver 1354RX recovers information modulated onto an RF carrier and provides the information to the receiver (RX) processor 1356.

The RX processor 1356 implements various signal processing functions of the L1 layer. The RX processor 1356 performs spatial processing on the information to recover any spatial streams destined for the UE 1350. If multiple spatial streams are destined for the UE 1350, they may be combined by the RX processor 1356 into a single OFDM symbol stream. The RX processor 1356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1310. These soft decisions may be based on channel estimates computed by the channel estimator 1358. The soft decisions are then decoded and deinterleaved to recover the data and control signals that were originally transmitted by the eNB 1310 on the physical channel. The data and control signals are then provided to the controller/processor 1359.

The controller/processor 1359 implements the L2 layer described earlier in connection with FIG. 12. In the UL, the control/processor 1359 provides demultiplexing between transport and logical channels, packet reassembly, deciphering, header decompression, control signal processing to recover upper layer packets from the core network. The upper layer packets are then provided to a data sink 1362, which represents all the protocol layers above the L2 layer. Various control signals may also be provided to the data sink 1362 for L3 processing. The controller/processor 1359 is also responsible for error detection using an acknowledgement (ACK) and/or negative acknowledgement (NACK) protocol to support HARQ operations.

In the UL, a data source 1367 is used to provide upper layer packets to the controller/processor 1359. The data source 1367 represents all protocol layers above the L2 layer (L2). Similar to the functionality described in connection with the DL transmission by the eNB 1310, the controller/processor 1359 implements the L2 layer for the user plane and the control plane by providing header compression, ciphering, packet segmentation and reordering, and multiplexing between logical and transport channels based on radio resource allocations by the eNB 1310. The controller/processor 1359 is also responsible for HARQ operations, retransmission of lost packets, and signaling to the eNB 1310.

Channel estimates derived by a channel estimator 1358 from a reference signal or feedback transmitted by the eNB 1310 may be used by the TX processor 1368 to select the appropriate coding and modulation schemes, and to facilitate spatial processing. Further, the TX processor 1368 may map resource elements into a frame in a fashion similar to that utilized by the TX processor 1316 in the eNB 1310, described above. The spatial streams generated by the TX processor 1368 may be provided to different antennae 1352 via separate transmitters 1354TX. Each transmitter 1354TX modulates an RF carrier with a respective spatial stream for transmission.

The UL transmission is processed at the eNB 1310 in a manner similar to that described in connection with the receiver function at the UE 1350. Each receiver 1318RX receives a signal through its respective antenna 1320. Each receiver 1318RX recovers information modulated onto an RF carrier and provides the information to a RX processor 1370. The RX processor 1370 implements the L1 layer.

The controller/processor 1359 implements the L2 layer described earlier in connection with FIG. 12. In the UL, the control/processor 1359 provides demultiplexing between transport and logical channels, packet reassembly, deciphering, header decompression, control signal processing to recover upper layer packets from the UE 1350. Upper layer packets from the controller/processor 1375 may be provided to the core network. The controller/processor 1359 is also responsible for error detection using an ACK and/or NACK protocol to support HARQ operations.

According to some aspects of the disclosure, the processing system 114 described in relation to FIG. 1 includes the eNB 1310. In particular, the processing system 114 includes the TX processor 1316, the RX processor 1370, and the controller/processor 1375. According to some aspects of the disclosure, the processing system 114 described in relation to FIG. 1 includes the UE 1350. In particular, the processing system 114 includes the TX processor 1368, the RX processor 1356, and the controller/processor 1359.

Figure 14:
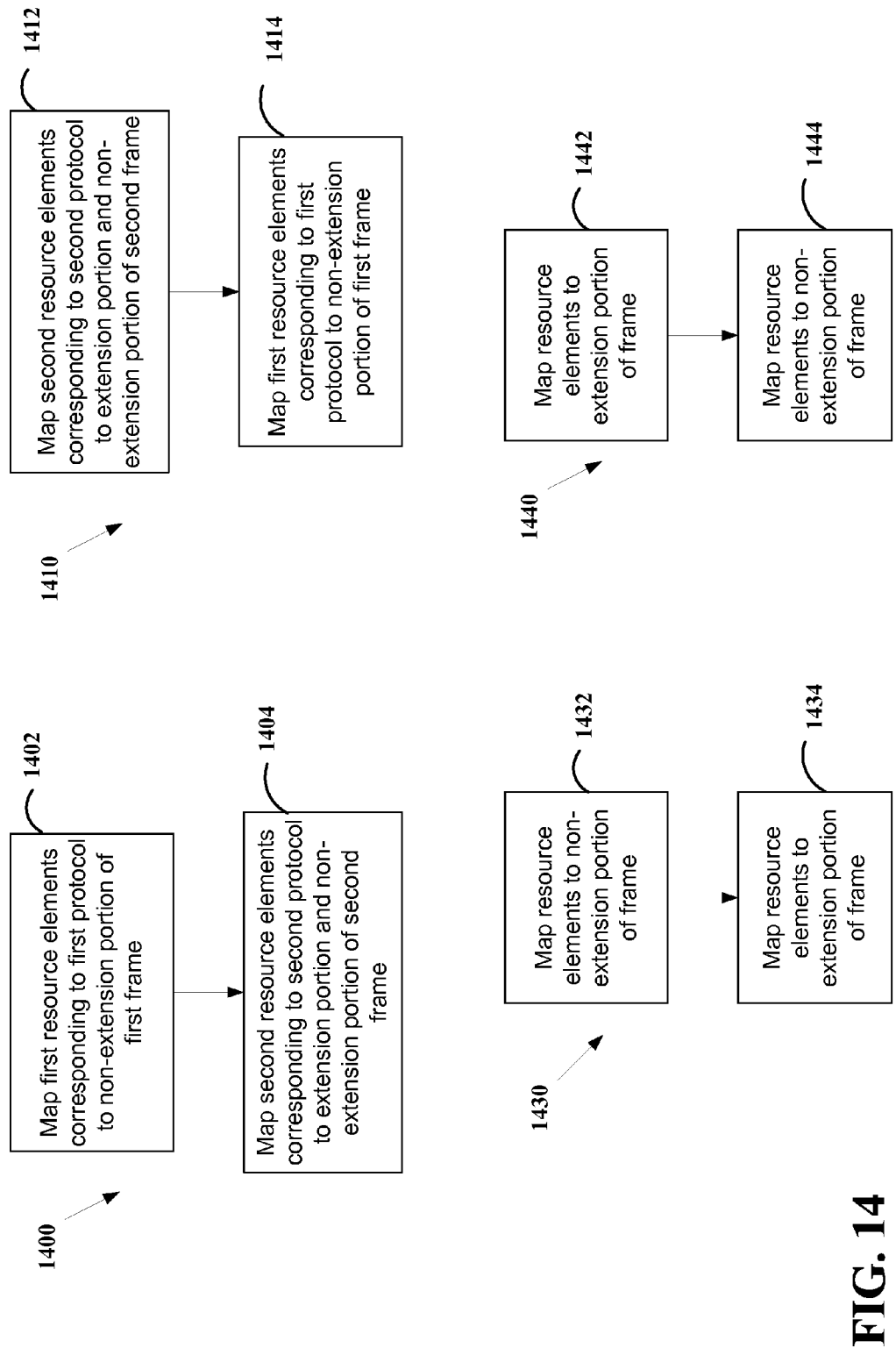
FIG. 14 is a series of flow charts of certain methods of wireless communication in accordance with various aspects of the disclosure.

FIG. 14 includes flow charts 1400, 1410, 1430, and 1440 illustrating certain methods of wireless communication in accordance with some aspects of the disclosure. In accordance with the a first method 1400, in block 1402, the process maps first resource elements corresponding to a first protocol (e.g., LTE Rel. 8) to a non-extension portion of a first frame. In block 1404, the process maps second resource elements corresponding to a second protocol (e.g., New LTE) to an extension portion and a non-extension portion of a second frame. Here, when the method 1400 is performed by an eNB, the first frame and the second frame may be the same DL frame, or may be different DL frames; and when the method 1400 is performed by a UE, the first frame is typically a different UL frame from the second frame. That is, an eNB may multiplex resources directed to different UEs following different protocols within the same downlink frame, but a UE typically is configured to provide information in accordance with one protocol in a particular uplink frame. On the other hand, a UE may be capable of providing information in accordance with either the first protocol or the second protocol in different frames.

In accordance with a second method 1410, in block 1412, the process maps second resource elements corresponding to a second protocol (e.g., New LTE) to an extension portion and the non-extension portion of frame. In block 1414, the process maps first resource elements corresponding to a first protocol (e.g., LTE Rel. 8) to the non-extension portion of a frame. Thus, as illustrated by exemplary processes 1400 and 1410, the order of mapping of the first and second resource elements may be reversed.

In accordance with the third method 1430, in block 1432, the process maps resource elements to a non-extension portion of a frame; and in block 1434, the process maps resource elements to an extension portion of the frame. In accordance with the fourth method 1440, in block 1442, the process maps resource elements to an extension portion of a frame; and in block 1444, the process maps resource elements to a non-extension portion of the frame. Thus, as illustrated by exemplary processes 1430 and 1440, the order of mapping the resource elements to the extension portion of the frame and the non-extension portion of the frame may be reversed.

Figure 15:
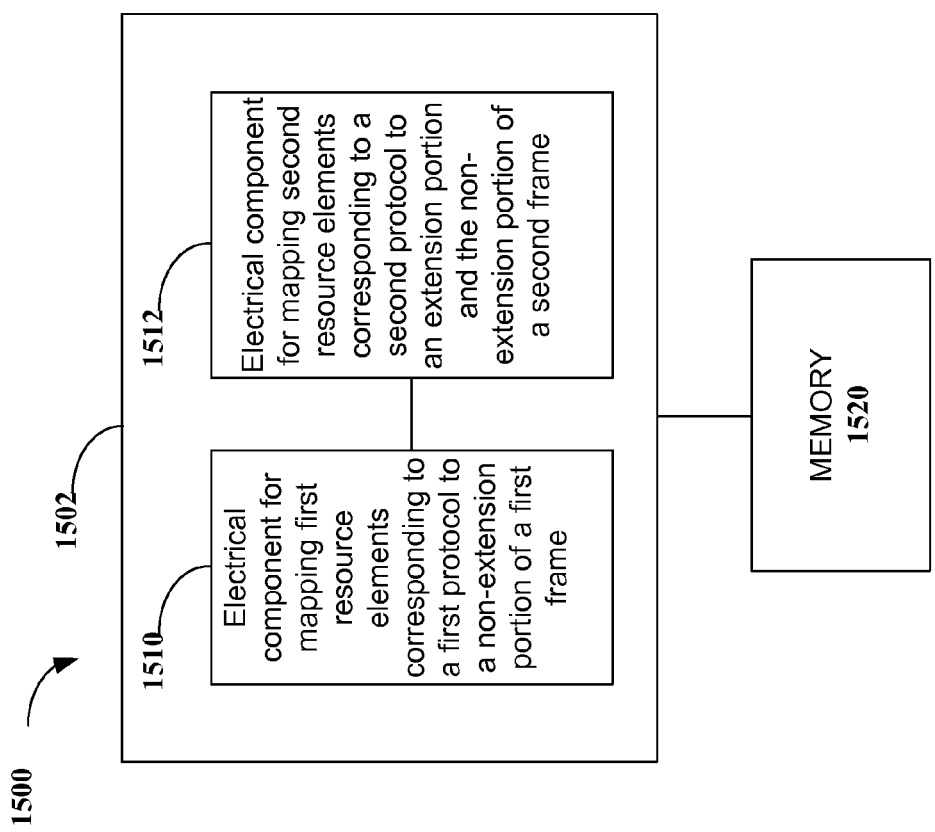
FIG. 15 is a block diagram illustrating the functionality of an exemplary apparatus.

FIG. 15 is a block diagram illustrating the functionality of an exemplary apparatus 1500. The apparatus 1500 may include a module 1502 that maps first resource elements corresponding to a first protocol to a non-extension portion of a first frame, and a module 1504 that maps second resource elements corresponding to a second protocol to an extension portion and the non-extension portion of a second frame.

Referring to FIG. 1 and FIG. 13, in one configuration, the apparatus 100 for wireless communication includes means for mapping first resource elements corresponding to a first protocol to a non-extension portion of a first frame, and means for mapping second resource elements corresponding to a second protocol to an extension portion and the non-extension portion of a second frame. The aforementioned means may be the processing system 114 configured to perform the functions recited by the aforementioned means. As described supra, the processing system 114 may includes the TX Processor 1316, the RX Processor 1370, and the controller/processor 1375. As such, in one configuration, the aforementioned means may be the TX Processor 1316, the RX Processor 1370, and the controller/processor 1375 configured to perform the functions recited by the aforementioned means.

In another configuration, the apparatus 100 for wireless communication includes means for mapping first resource elements corresponding to a first protocol to a non-extension portion of a first frame, and means for mapping second resource elements corresponding to a second protocol to an extension portion and the non-extension portion of a second frame. The aforementioned means may be the processing system 114 configured to perform the functions recited by the aforementioned means. As described supra, the processing system 114 may include the TX Processor 1368, the RX Processor 1356, and the controller/processor 1359. As such, in one configuration, the aforementioned means may be the TX Processor 1368, the RX Processor 1356, and the controller/processor 1359 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
determining first resource assignments corresponding to a first protocol and second resource assignments corresponding to a second protocol for mapping in a first downlink subframe;
mapping first resource elements corresponding to the first protocol and a first portion of second resource elements corresponding to the second protocol to a non-extension portion of the first downlink subframe, wherein an extension portion of the first downlink subframe is exclusive of the first resource elements, and wherein the non-extension portion comprises a control region for carrying control information comprising the first resource assignments and the second resource assignments for the first downlink subframe;
mapping a second portion of the second resource elements corresponding to the second protocol to the extension portion of the first downlink subframe, wherein the mapping of the extension portion is treated separately from the mapping of the non-extension portion; and transmitting the first downlink subframe, wherein the extension portion of the first downlink subframe comprises a bandwidth extension unavailable to a user equipment operating in accordance with the first protocol.

2. The method of claim 1, wherein the mapping of the first and the second resource elements follows a frequency-first, time-second mapping order.

3. The method of claim 1, wherein the first protocol is an LTE protocol in accordance with a 3GPP Release 8 standard, and the second protocol is an LTE protocol in accordance with a 3GPP standard subsequent to Release 8.

4. The method of claim 1, wherein the mapping to the extension portion and the mapping to the non-extension portion each corresponds to a physical downlink shared channel.

5. The method of claim 1, wherein the mapping to the extension portion is performed before the mapping to the non-extension portion.

6. The method of claim 1, wherein the mapping to the non-extension portion is performed before the mapping to the extension portion.

7. The method of claim 1, wherein
the mapping to the extension portion and the mapping to the non-extension portion each follows a time-first, frequency-second mapping order.

8. The method of claim 1, further comprising: determining third resource assignments corresponding to the first protocol for mapping within a non-extension portion of a second downlink subframe; and
mapping third resource elements corresponding to the first protocol, but not the second protocol, to the non-extension portion of the second downlink subframe in response to the third resource assignments.

9. The method of claim 1, further comprising: determining third resource assignments corresponding to the second protocol for mapping within an extension portion and a non-extension portion of a second downlink subframe; and
mapping third resource elements corresponding to the second protocol, but not the first protocol, to the extension portion and the non-extension portion of the second downlink subframe in response to the third resource assignments.

10. The method of claim 1, further comprising:
mapping third resource elements for data allocation corresponding to the first protocol to a non-extension portion of a second downlink subframe; and
mapping fourth resource elements for data allocation corresponding to the second protocol to the extension portion of the second downlink subframe.

11. An apparatus for wireless communication, comprising:
means for determining first resource assignments corresponding to a first protocol and second resource assignments corresponding to a second protocol for mapping in a first downlink subframe;
means for mapping first resource elements corresponding to the first protocol and a first portion of second resource elements corresponding to the second protocol to a non-extension portion of the first downlink subframe, wherein an extension portion of the first downlink subframe is exclusive of the first resource elements, and wherein the non-extension portion comprises a control region for carrying control information comprising the first resource assignments and the second resource assignments for the first downlink subframe; and means for mapping a second portion of the second resource elements corresponding to the second protocol to the extension portion of the first downlink subframe,
wherein the means for mapping to the extension portion is configured to treat the mapping to the extension portion separately from the mapping to the non-extension portion by the means for mapping to the non-extension portion,
wherein the extension portion of the first downlink subframe comprises a bandwidth extension unavailable to a user equipment operating in accordance with the first protocol.

12. The apparatus of claim 11, wherein the means for mapping the first and the second resource elements follow a frequency-first, time-second mapping order.

13. The apparatus of claim 11, wherein the first protocol is an LTE protocol in accordance with a 3GPP Release 8 standard, and the second protocol is an LTE protocol in accordance with a 3GPP standard subsequent to Release 8.

14. The apparatus of claim 11, wherein the means for mapping to the extension portion and the means for mapping to the non-extension portion are each configured to map their respective resource elements in correspondence to a physical downlink shared channel.

15. The apparatus of claim 11, wherein the means for mapping to the extension portion is configured to complete the mapping of the second resource elements to the extension portion prior to the mapping of the first resource elements and the second resource elements to the non-extension portion by the means for mapping to the non-extension portion.

16. The apparatus of claim 11, wherein the means for mapping to the non-extension portion is configured to complete the mapping of the first resource elements and the second resource elements to the non-extension portion prior to the mapping of the second resource elements to the extension portion by the means for mapping to the extension portion.

17. The apparatus of claim 11, wherein
the means for mapping to the extension portion and the means for mapping to the non-extension portion are each configured to follow a time-first, frequency-second mapping order.

18. The apparatus of claim 11, further comprising:
means for determining third resource assignments corresponding to the first protocol for mapping within a non-extension portion of a second downlink subframe; and
means for mapping third resource elements corresponding to the first protocol, but not the second protocol, to the non-extension portion of the second downlink subframe in response to the third resource assignments.

19. The apparatus of claim 11, further comprising:
means for determining third resource assignments corresponding to the second protocol for mapping within an extension portion and a non-extension portion of a second downlink subframe; and
means for mapping third resource elements corresponding to the second protocol, but not the first protocol, to the extension portion and the non-extension portion of the second downlink subframe in response to the third resource assignments.

20. The apparatus of claim 11, comprising:
means for mapping third resource elements for data allocation corresponding to the first protocol to a non-extension portion of a second downlink subframe; and
means for mapping fourth resource elements for data allocation corresponding to the second protocol to the extension portion of the second downlink subframe.

21. A computer program product, comprising:
a non-transitory computer-readable medium comprising:
- instructions for causing a computer to determine first resource assignments corresponding to a first protocol and second resource assignments corresponding to a second protocol for mapping in a first downlink subframe;
- instructions for causing the computer to map first resource elements corresponding to the first protocol and a first portion of second resource elements corresponding to the second protocol to a non-extension portion of the first downlink subframe wherein an extension portion of the first downlink subframe is exclusive of the first resource elements, and wherein the non-extension portion comprises a control region for carrying control information comprising the first resource assignments and the second resource assignments for the first downlink subframe; and
- instructions for causing the computer to map a second portion of the second resource elements corresponding to the second protocol to the extension portion of the first downlink subframe, wherein the instructions for causing the mapping to the extension portion cause the mapping to the extension portion and the mapping to the non-extension portion to be treated separately,
- wherein the extension portion of the first downlink subframe comprises a bandwidth extension unavailable to a user equipment operating in accordance with the first protocol.

22. An apparatus for wireless communication, comprising:
a memory; and
a processor coupled to the memory, the processor configured to:
- determine first resource assignments corresponding to a first protocol and second resource assignments corresponding to a second protocol for mapping in a first downlink subframe;
- map first resource elements corresponding to the first protocol and a first portion of second resource elements corresponding to the second protocol to a non-extension portion of the first downlink subframe, wherein an extension portion of the first downlink subframe is exclusive of the first resource elements, and wherein the non-extension portion comprises a control region for carrying control information comprising the first resource assignments and the second resource assignments for the first downlink subframe; and
- map a second portion of the second resource elements corresponding to the second protocol to the extension portion of the first downlink subframe, wherein the mapping to the extension portion and the mapping to the non-extension portion are treated separately,
- wherein the extension portion of the first downlink subframe comprises a bandwidth extension unavailable to a user equipment operating in accordance with the first protocol.

* * * * *